United States Patent
Higgins et al.

(10) Patent No.: US 11,758,385 B2
(45) Date of Patent: Sep. 12, 2023

(54) SYSTEM AND METHOD FOR INTEROPERABILITY IN REMOTE PROVISIONING ARCHITECTURES FOR EMBEDDED UNIVERSAL INTEGRATED CIRCUIT CARDS

(71) Applicant: Tata Communications (America) Inc., Herndon, VA (US)

(72) Inventors: Michael Joseph Higgins, Singapore (SG); Damien John Stephens, Richmond (GB); Minh Tam Patrick Cao, Singapore (SG)

(73) Assignee: Tata Communications (America) Inc., Reston, VA (US)

( * ) Notice: Subject to any disclaimer, the term of this patent is extended or adjusted under 35 U.S.C. 154(b) by 206 days.

(21) Appl. No.: 17/052,490

(22) PCT Filed: May 6, 2019

(86) PCT No.: PCT/US2019/030825
§ 371 (c)(1),
(2) Date: Nov. 2, 2020

(87) PCT Pub. No.: WO2019/213645
PCT Pub. Date: Nov. 7, 2019

(65) Prior Publication Data
US 2021/0250750 A1    Aug. 12, 2021

Related U.S. Application Data

(60) Provisional application No. 62/667,316, filed on May 4, 2018.

(51) Int. Cl.
*H04W 8/18*    (2009.01)
*H04W 8/22*    (2009.01)

(52) U.S. Cl.
CPC ............ *H04W 8/183* (2013.01); *H04W 8/22* (2013.01)

(58) Field of Classification Search
None
See application file for complete search history.

(56) References Cited

U.S. PATENT DOCUMENTS

2014/0004827 A1* 1/2014 O'Leary ............... H04W 12/35
                                                                455/411
2014/0140509 A1* 5/2014 Chastain ............... H04W 8/205
                                                                380/270
(Continued)

FOREIGN PATENT DOCUMENTS

WO    2019/213645 A1    11/2019

OTHER PUBLICATIONS

Controller: A P Srivastava, Office Action issued in Indian patent application No. 202027051868, dated Dec. 22, 2021, 6 pp.
(Continued)

*Primary Examiner* — Jinsong Hu
*Assistant Examiner* — Alexander J Yi
(74) *Attorney, Agent, or Firm* — KAPLAN BREYER SCHWARZ, LLP

(57) ABSTRACT

A system is provided that allows profiles from multiple mobile network operators to be provisioned across multiple eUICCs from different eUICC manufacturers that may each utilize different provisioning methods. This is accomplished through the use of an abstraction layer with application programming interfaces (APIs) that enable SM-DP and SM-SR functionality for eUICCs from multiple eUICC manufacturers and for multiple MNO profiles.

9 Claims, 2 Drawing Sheets

(56) References Cited

U.S. PATENT DOCUMENTS

| | | |
|---|---|---|
| 2014/0308942 A1 | 10/2014 | Christopher et al. |
| 2015/0134958 A1 | 5/2015 | Merrien et al. |
| 2015/0163056 A1 | 6/2015 | Nix |
| 2015/0271662 A1* | 9/2015 | Lhamon ................ H04W 8/183 370/329 |
| 2017/0171742 A1* | 6/2017 | Yang ..................... G06F 3/0604 |
| 2017/0311152 A1 | 10/2017 | Sinning et al. |
| 2019/0028881 A1* | 1/2019 | Namiranian .......... H04W 8/183 |

OTHER PUBLICATIONS

Authorized Officer: Blaine R. Copenhaver, International Search Report and Written Opinion issued in counterpart PCT application No. PCT/US2019/030825, dated Jul. 17, 2019, 15 pp.

\* cited by examiner

SYSTEM AND METHOD FOR INTEROPERABILITY IN REMOTE PROVISIONING ARCHITECTURES FOR EMBEDDED UNIVERSAL INTEGRATED CIRCUIT CARDS

STATEMENT OF RELATED CASES

This application claims priority to U.S. Provisional Application Ser. No. 62/667,316, filed May 4, 2018, whose entire disclosure is incorporated herein by reference.

FIELD OF THE INVENTION

The present invention relates to wireless communication technology and, more particularly, to systems and methods for provisioning and managing multiple Embedded Subscriber Identity Modules (eSIMs) that are implemented on embedded Universal Integrated Circuit Cards (eUICCs) across multiple eUICC manufacturers and multiple Mobile Network Operators (MNOs).

BACKGROUND OF THE INVENTION

The Embedded UICC (eUICC—Universal Integrated Circuit Card) is an evolution of the Mobile SIM (Subscriber Identification Module) whereby the functionality is now a programmable capability permanently installed into the end user device at manufacturing time.

This capability allows the Mobile Network Operator (MNO), to modify, replace or remove eSIM profiles within the eUICC to tailor the connectivity of the device to the mobile network with which the device will communicate.

With a eUICC, the MNO can now load multiple profiles onto the device, to essentially create multiple 'personalities' for that device's mobile connectivity. Each profile would enable the device to connect to one or more mobile networks in a different way, which could change the policies, rates, and performance of the device.

The downloading, updating or deletion of these profiles is accomplished via an over the air (OTA) service and defined in the GSMA Specification SGP.02 v3.2 (27 Jun. 2017). The High-level architecture 100 for this system is provided in SGP.02 v3.2 and is shown in FIG. 1. In this depiction, the Certificate Issuer (CI) 110 represents a Certificate Authority which provides secure credentials used by the MNO 115 to safely conduct the operations of intercommunication with the eUICC 120.

The eUICC Manufacturer (EUM) 130 and the MNO 115 must work together in order to put in place the necessary tools and credentials to establish secure communications and download over the air (OTA) profiles or profile changes to the eUICC 120.

The two key components in this process are the:
1. Subscription Manager Data Preparation Stack (SM-DP) 140
2. Subscription Manager Secure Routing Stack (SM-SR) 150

The SM-DP 140 securely packages profiles to be provisioned on the eUICC 120, and manages the installation of these profiles onto the eUICC 120. Operators use the SM-DP 140 to securely encrypt their operator credentials (profile) so that they are ready for over the air installation onto the eUICC 120. The SM-SR 150 securely delivers the encrypted profile to the eUICC 120 and then, once the profile is loaded, remotely manages the eUICC 120 thereafter (e.g., enable, disable and delete profiles as necessary during the device's lifetime).

These stacks 140 and 150 enable the storing, instructions and downloading of the profile or profile data files necessary to conduct profile management on the eUICC 120. SGP.02 v3.2 covers, in detail, the process by which these functions are conducted. Each MNO 115 would have its own capabilities to enable these functions in their network.

However, in the global scheme of mobile networking, there are a great many Virtual MNOs (MVNO) (not shown) who use the capabilities of one or more MNOs 115. When operating in this manner, the MVNO will often encounter the need to perform interoperations across more than one MNO 115 and their Profile Management capabilities. In fact, the MVNO will have their own profile which may need to exist in multiple SM-DPs or vary from SM-DP to SM-DP. There are also a large number of non-standard methods in existence which use a so-called "closed-loop" method of accomplishing the profile management.

Thus, there is a need for a system and method through which different profiles from different mobile network operators (MNOs 115 or MVNOs) can be provisioned across multiple eUICCs 120 from different EUMs 130 that require different provisioning methods (standard and proprietary methods).

SUMMARY OF THE INVENTION

An object of the invention is to solve at least the above problems and/or disadvantages and to provide at least the advantages described hereinafter.

The present invention provides a system and method that allows profiles from multiple MNOs to be provisioned across multiple eUICCs from different EUMs that may require different provisioning methods. This is accomplished through the use of an abstraction layer with application programming interfaces (APIs) that enable SM-DP and SM-SR functionality for eUICCs from multiple EUMs and for multiple MNO profiles.

Thus, the present invention allows for original equipment manufacturers (OEMs) and device resellers to easily transition between different eUICC manufacturers and to also switch MNOs.

An embodiment of the invention is a system for re-provisioning embedded universal integrated circuit cards (eUICCs), wherein each embedded universal integrated circuit card (eUICC) is associated with a eUICC manufacturer (EUM) and is provisioned with a respective initial mobile network operator (MNO) profile that is associated with a respective initial MNO, comprising: at least one processor that executes program control instructions to: maintain a database of MNO profiles associated with a plurality of MNOs; and emulate the commands and/or functions required to replace the initial MNO profile on a selected one of a plurality of eUICCs with a second MNO profile that is associated with a second MNO; wherein the initial and second MNO profiles on the selected eUICC configure a wireless device to communicate with first and second networks associated with the initial and second MNO, respectfully.

Another embodiment of the invention is a method for re-provisioning embedded universal integrated circuit cards (eUICCs), wherein each embedded universal integrated circuit card (eUICC) is associated with a eUICC manufacturer (EUM) and is provisioned with a respective initial mobile network operator (MNO) profile that is associated with a respective initial MNO, comprising: maintaining a database of MNO profiles associated with a plurality of MNOs; and emulating the commands and/or functions required to replace the initial MNO profile on a selected one of a plurality of eUICCs with a second MNO profile that is associated with a second MNO; wherein the initial and second MNO profiles on the selected eUICC configure a wireless device to communicate with first and second networks associated with the initial and second MNO, respectfully.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
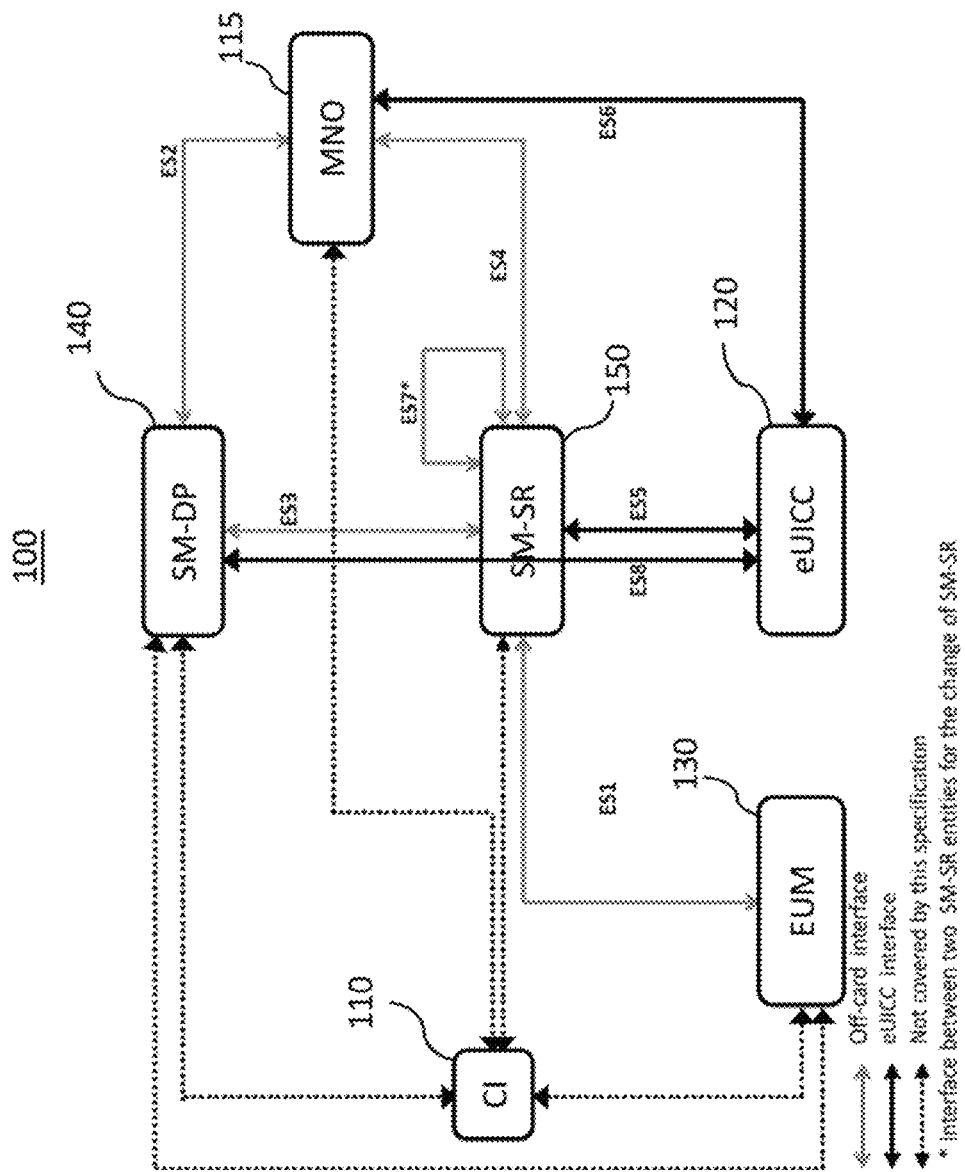
FIG. 1 is a schematic diagram showing the high-level architecture for an over the air service system, which is reproduced from GSMA Specification SGP.02 v3.2.

The following description merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure. In addition, it will be appreciated by those skilled in the art that any flow charts, flow diagrams, state transition diagrams, pseudocode, and the like represent various processes which may be substantially represented in a computer readable medium and so executed by a computer or processor, whether or not such computer or processor is explicitly shown.

In the claims hereof any element expressed as a means for performing a specified function is intended to encompass any way of performing that function including, for example: a) a combination of circuit elements which performs that function; or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

As discussed above, SM-DP 140 and SM-SR 150 enable the storing, instructions and downloading of the profile or profile data files necessary to conduct profile management on a eUICC 120. Each MNO 115 needs to establish their own SM-DP 140 and SM-SR 150 in order to provision their own eUICCs 120. The SM-DP 140 and SM-SR 150 are typically provided by the EUM 130 that manufactured the eUICCs 120 for the MNO 115 and are integrated into each MNO's network and provisioning systems. Importantly, the SM-DP 140 and SM-SR 150 provided by one EUM for provisioning their eUICCs typically cannot be used to provision eUICCs from other EUMs. Further, each MNO will typically modify the SM-DP 140 and/or the SM-SR 150 in order to integrate them into their existing provisioning systems. Thus, even if MNO "A" and MNO "B" use a common eUICC 120 from a common EUM, the SM-DP 140 and/or the SM-SR 150 of MNO "A" typically cannot be used to provision MNO "B" and vice versa.

This approach limits the EUMs 130 that OEMs, resellers or enterprises can use, and the profiles they can place on an eUICC 120. For example, there are over 800 MNOs throughout the world. In order for the SM-SR of an MNO "A" to operate with the SM-DP of an MNO "B", the two MNOs must integrate their different systems. Thus, it would be an impossible task to enable interoperability between all known MNOs using targeted integration.

Examples of MNOs include, but are not limited to, AT&T®, Verizon, Singtel, China Telecom and Orange™. Examples of EUMs include, but are not limited to, Gemalto™, Oasis, Idemia and G+D.

Figure 2:
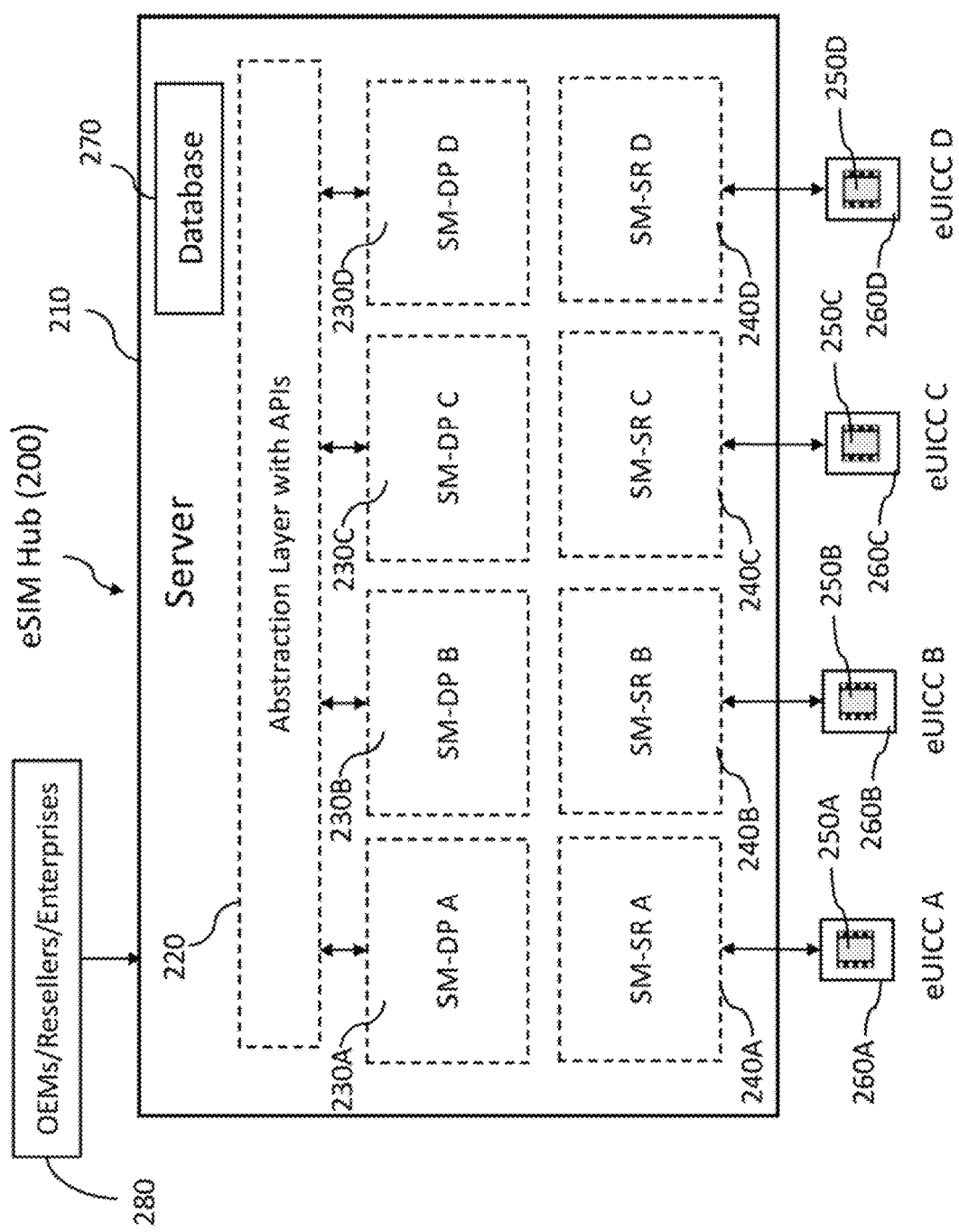
FIG. 2 is a schematic diagram of an eSIM Hub, in accordance with one exemplary embodiment of the present invention.

FIG. 2 is a schematic diagram of an eSIM Hub 200, in accordance with one exemplary embodiment of the present invention. The eSIM Hub 200 is preferably implemented on a server 210 that executes program control instructions to enable an abstraction layer with application programming interfaces (APIs) 220. The abstraction layer with APIs 220 is used to emulate the functions of SM-DPs and SM-SRs used to provision eUICCs from different EUMs and/or used to provision eUICCs associated with different MNOs.

The wireless device profiles used by different MNOs differ in content. eSIM Hub 200 allows one to swap out one MNO's profile for another MNO's profile, without altering the personality of the wireless device itself. This allows the content and behavior of the wireless device to remain the same, while allowing the wireless device to access a different network via a different MNO. By emulating the SM-DP associated with a wireless device, a third party (e.g., an OEM, reseller or enterprise) can manage the profile of the wireless device just like the wireless device's original MNO would be able to manage the profile. Using the emulated SM-DP, a third party would be able to prepare a new profile associated with a different MNO, store the new profile and forward the new profile to the emulated SM-SR. The emulated SM-SR would then be able to deliver the new profile to the wireless device, which would allow the wireless device to then access the network of the different MNO.

In the example shown in FIG. 2, elements 230A-230D represent the emulated functions of four different SM-DPs. Elements 240A-240D represent the emulated functions of four different SM-SRs. SM-DP 230A and SM-SR 240A are used to provision eUICC A installed in wireless device 260A. Likewise: SM-DP 230B and SM-SR 240B are used to provision eUICC 250B installed in wireless device 260B; SM-DP 230C and SM-SR 240C are used to provision eUICC 250C installed in wireless device 260C; and SM-DP 230D and SM-SR 240D are used to provision eUICC 250D installed in wireless device 260D. The server 210 preferably maintains a database 270 or other data structure for storing MNO profiles that are used for provisioning eUICCs 250A-250D.

The eSIM Hub 200 allows OEMs, resellers and/or enterprises 280 to provision and manage eUICCs across multiple eUICC manufacturers and multiple local and global MNOs. This is technically challenging and the eSIM Hub 200 abstracts the M:N complexity through the abstraction layer with APIs 220. Examples of OEMs include car manufacturers that incorporate wireless devices in their automobiles, smartwatch manufacturers that incorporate wireless communication capabilities into their smartwatches, smartphone manufacturers, and generally any product manufacturer that incorporates wireless communication capabilities into their products. Resellers are any entity that resells products manufactured by OEMs that incorporate wireless communication capabilities. Enterprises include any organization or business that utilizes wireless communication devices such as, for example, a car rental company that rents cars that are equipped with wireless communication devices.

In one example, each of eUICCs 250 A-D are from a common EUM, however, they are each associated with a different MNO. Because each MNO will typically modify the SM-DP and/or the SM-SR provided by the eUICC's manufacturer, The SM-DPs and SM-SRs of each MNO will not be interoperable even though they share the same type of eUICC. The abstraction layer 220 can emulate the SM-DP and SM-SR required to provision each eUICC so that, for example, eUICC 250A, which is associated with MNO A can be re-provisioned with the profile of MNO B by emulating the SM-DP and SM-SR required to provision eUICC 250A (the SM-DP and SM-SR used by MNO A). In this way, the eUICC 250A can be instructed to switch to the profile of MNO B, if the profile of MNO B is already stored on the eUICC 250A, or the profile of MNO B can be installed in eUICC 250A if it is not already stored in eUICC 250A.

In another example, each of eUICCs 250 A-D are from a different EUM, however, they are associated with a common MNO. Because each of eUICCs 250 A-D are from a different EUM, the SM-DPs and SM-SRs required to provision each eUICC will not be interoperable. The abstraction layer 220, can emulate the SM-DP and SM-SR required to provision each eUICC so that, for example, eUICC 250A, which is associated with MNO A and is manufactured by EUM A can be re-provisioned with the profile of MNO B by emulating the SM-DP and SM-SR required to provision eUICC 250A. In this way, the eUICC 250A can be instructed to switch to the profile of MNO B, if the profile of MNO B is already stored on the eUICC 250A, or the profile of MNO B can be installed in eUICC 250A if it is not already stored in eUICC 250A.

The eSIM Hub 200 provides a simple uniform interface for OEMs, resellers and enterprises 280 to provision eUICCs with any MNO profile. In particular, the eSIM Hub 200 is able to emulate a wireless device's current MNO when the wireless device is introduced into the operational environment of a "foreign" or remote MNO outside the normal service area provided by the wireless device's current MNO. The eSIM Hub 200 is able to determine which MNO profile is currently operating on the eUICC of the wireless device and then either instruct the eUICC to switch to another MNO profile stored on the eUICC that corresponds to the remote MNO or install the required MNO profile for the remote MNO is it is not already stored on the eUICC.

In one exemplary embodiment, the server 210 is programmed with control instructions that enable it to automatically load a new MNO profile onto a eUICC, or switch to a new MNO profile stored on the eUICC, when the eUICC enters a geographic area that is not serviced by the MNO's profile currently active on the eUICC. The new MNO profile that is loaded or activated on the eUICC is the MNO profile for the MNO that services the geographic area where the eUICC is currently located.

As an illustrative example, consider a car located in Europe that is equipped with a wireless communication device. The owner of the car resides in Country A and the owner has a contract with MNO A for wireless services, which covers his residence country (Country A). Thus, the wireless communication device in the car has a eUICC that is loaded with the profile of MNO A in order to access MNO A's network. If the owner of the car drives to Country B, which is serviced by MNO B, the server 210 automatically detects that the eUICC in the car is in an area that is not serviced by MNO A. Upon detecting this, the server 210 either instructs the eUICC in the car to switch to the profile required for MNO B (if the required profile is already stored in the eUICC) or will provision the eUICC with the profile required for MNO B using the abstraction layer 220, which will emulate the SM-DP and SM-SR of MNO A in order to provision eUICC.

In one illustrative embodiment, the server 210 detects that the eUICC is in an area not serviced by the eUICC's currently active MNO profile via a bootstrap profile that is stored in the eUICC. If the eUICC cannot connect with a new MNO network that services the geographic where the eUICC is currently located, the bootstrap profile allows the eUICC to establish communication with the server 210, which will then utilize the abstraction layer 220 to instruct the eUICC in the car to switch to the profile required for new MNO (if the required profile is already stored in the eUICC) or will provision the eUICC with the profile required for the new MNO.

The server 210 can be implemented as one or more computing devices or processors that are configured to implement the eSIM Hub 200 functionality illustrated in FIG. 2 and described above. The server 210 can, for example, comprise one or more physical servers, a cloud computing infrastructure and/or other server devices. In embodiments in which the server 210 is implemented by multiple physical computing devices, the computing devices can be co-located in a common location, or can be distributed across multiple physical locations and communicate over a network.

The foregoing embodiments and advantages are merely exemplary, and are not to be construed as limiting the present invention. The description of the present invention is intended to be illustrative, and not to limit the scope of the claims. Many alternatives, modifications, and variations will be apparent to those skilled in the art. Various changes may be made without departing from the spirit and scope of the invention.

What is claimed is:

1. A system for automatically re-provisioning embedded universal integrated circuit cards (eUICCs), wherein each embedded universal integrated circuit card (eUICC) is associated with a eUICC manufacturer (EUM) and is provisioned with a respective initial mobile network operator (MNO) profile that is associated with a respective initial MNO,
wherein the initial MNO operates a first network that covers a first MNO geographic area, comprising:
at least one processor that executes program control instructions to:
maintain a database of MNO profiles associated with a plurality of MNOs; determine if a eUICC is located outside the first MNO geographic area; and
if the eUICC is located outside the first MNO geographic area, then emulate commands and/or functions that are used by the initial MNO to provision the initial MNO profile on the eUICC to replace the initial MNO profile on the eUICC with a second MNO profile that is associated with a second MNO that operates a second network that covers a geographic area where the eUICC is located;
wherein the initial and second MNO profiles on the eUICC configure a wireless device to communicate with the first and second networks, respectfully, wherein the commands and/or functions that are emulated include a subscription manager data stack (SM-DP) and/or a subscription manager secure routinq stack (SM-SR) that are used by the initial MNO to provision the initial MNO profile on the eUICC.

2. The system of claim 1, wherein the at least one processor executes program control instructions to enable an abstraction layer with application programming interfaces (APIs) that is used to emulate the commands and/or functions.

3. The system of claim 1, wherein the at least one processor comprises a server.

4. The system of claim 1, wherein the second MNO profile is pre-stored on the eUICC, and the emulated commands and/or functions comprise commands and/or functions that cause the eUICC to switch from the initial MNO profile to the second MNO profile that is pre-stored on the eUICC.

5. The system of claim 1, wherein the emulated commands and/or functions comprise commands and/or functions that load the second MNO profile onto the eUICC, wherein the second MNO profile is obtained from the database of MNO profiles.

6. A method for automatically re-provisioning embedded universal integrated circuit cards (eUICCs),
wherein each embedded universal integrated circuit card (eUICC) is associated with a eUICC manufacturer (EUM) and is provisioned with a respective initial mobile network operator (MNO) profile that is associated with a respective initial MNO,
wherein the initial MNO operates a first network that covers a first MNO geographic area, comprising: maintaining a database of MNO profiles associated with a plurality of MNOs;
determining if a eUICC is located outside the first MNO geographic area; and
if the eUICC is located outside the first MNO geographic area, then emulating the commands and/or functions that are used by the initial MNO to provision the initial MNO profile on the eUICC to replace the initial MNO profile on the eUICC with a second MNO profile that is associated with a second MNO that operates a second network that covers a geographic area where the eUICC is located;
wherein the initial and second MNO profiles on the eUICC configure a wireless device to communicate with the first and second networks, respectfully,
wherein the commands and/or functions that are emulated include a subscription manager data stack (SM-DP) and/or a subscription manager secure routing stack (SM-SR) that are used by the initial MNO to provision the initial MNO profile on the eUICC.

7. The method of claim 6, further comprising enabling an abstraction layer with application programming interfaces (APIs) that is used to emulate the commands and/or functions.

8. The method of claim 6, wherein the second MNO profile is pre-stored on the eUICC, and wherein emulating the commands and/or functions comprise emulating commands and/or functions that cause the eUICC to switch from the initial MNO profile to the second MNO profile that is pre-stored on the eUICC.

9. The method of claim 6, wherein emulating the commands and/or functions comprise emulating commands and/or functions that load the second MNO profile onto the eUICC, wherein the second MNO profile is obtained from the database of MNO profiles.

* * * * *